US006361065B1

(12) United States Patent
Frisch

(10) Patent No.: US 6,361,065 B1
(45) Date of Patent: Mar. 26, 2002

(54) AIR BAG MODULE AS VIBRATION DAMPER

(75) Inventor: Ralph Frisch, Mömbris (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/498,175

(22) Filed: Feb. 4, 2000

(30) Foreign Application Priority Data

Feb. 5, 1999 (DE) .................................... 299 02 033 U

(51) Int. Cl.⁷ ............................................. B60R 21/16
(52) U.S. Cl. .................................... 280/728.2; 280/731
(58) Field of Search ............................ 280/728.2, 731, 280/741

(56) References Cited

U.S. PATENT DOCUMENTS

| 3,819,205 A | * | 6/1974 | Dunford et al. ...... 280/150 AB |
| 5,024,464 A | * | 6/1991 | Kawaguchi et al. ........ 280/731 |
| 5,383,682 A | * | 1/1995 | Nagata et al. .............. 280/731 |
| 5,410,114 A | * | 4/1995 | Furuie et al. ............ 200/61.55 |
| 5,480,184 A | * | 1/1996 | Young ........................ 280/731 |
| 5,624,130 A | * | 4/1997 | Ricks ...................... 280/728.2 |
| 5,700,029 A | * | 12/1997 | Enders .................... 280/728.2 |
| 5,730,459 A | * | 3/1998 | Kanda ..................... 280/728.2 |
| 5,738,369 A | * | 4/1998 | Durrani ................... 280/728.2 |
| 5,826,901 A | * | 10/1998 | Adomeit .................. 280/728.2 |
| 5,931,492 A | * | 8/1999 | Mueller et al. .......... 280/728.2 |
| 6,095,549 A | * | 8/2000 | Adomeit et al. ......... 280/728.2 |
| 6,164,689 A | * | 12/2000 | Rivin et al. ................. 280/731 |

FOREIGN PATENT DOCUMENTS

| DE | 2021930 | 11/1971 |
| DE | 2935936 | 3/1981 |
| DE | 3710173 | 10/1988 |
| DE | 3925761 | 2/1990 |
| DE | 4326515 | 3/1994 |
| DE | 4439576 | 5/1996 |
| DE | 19653684 | 6/1998 |
| DE | 19725684 | 12/1998 |
| DE | 19731314 | 1/1999 |
| DE | 29816923 | 1/1999 |
| DE | 29816925 | 1/1999 |
| DE | 19743615 | 4/1999 |
| EP | 0857625 | 8/1998 |
| GB | 2270045 | 8/1993 |
| JP | 61196 A1 | * 1/1994 ........... B60R/21/20 |

* cited by examiner

Primary Examiner—Brian L. Johnson
Assistant Examiner—Joselynn Y. Sliteris
(74) Attorney, Agent, or Firm—Tarolli, Sundheim, Covell, Tummino & Szabo L.L.P.

(57) ABSTRACT

An air bag module for a motor vehicle steering wheel having a steering wheel axis comprises the following components: a gas bag, an inflator having a housing, a cover cap, an inflator support, an annular mounting plate arranged on the inflator support, and a mounting cylinder made of an elastic material and oriented parallel to the steering wheel axis. Further, a device for interconnecting the components into the module are provided. The mounting cylinder has free rims connected, on the one hand, to the mounting plate and, on the other, to the inflator.

17 Claims, 3 Drawing Sheets

AIR BAG MODULE AS VIBRATION DAMPER

TECHNICAL FIELD

The invention relates to an air bag module for a motor vehicle steering wheel.

BACKGROUND OF THE INVENTION

In a known steering wheel an air bag module of the aforementioned kind serves in all, or as part thereof, as a vibration damper, i.e. for suppressing unwanted vibrations excited by the chassis and transmitted into the steering wheel (DE 3925761 A1). For this purpose the air bag module or a part thereof is connected to the steering wheel in such a manner that a certain movement of the air bag module relative to the steering wheel is possible. The actual connecting means consist of rivets or bolts, elastic means being provided between the parts to be connected to each other, however, to ensure that no rigid connection results and that the air bag module, or a part thereof, is free to vibrate relative to the steering wheel and may thus be utilized as a vibration damper.

Experience has shown, however, that by the known elastic connection between air bag module and steering wheel only very small vibration amplitudes are achieved and that damping is effective only in a relative narrow-frequency range due to the ability of the elastic material employed to elastically deform being heavily restricted by the actual connecting means (rivets, bolts).

BRIEF SUMMARY OF THE INVENTION

The invention provides an air bag module which utilizes the air bag module as a vibration damper in the steering wheel with the improvement that unwanted vibrations of the steering wheel are better suppressed.

The air bag module according to the invention for a motor vehicle steering wheel having a steering wheel axis comprises the following components: a gas bag, an inflator having a housing, a cover cap, an inflator support, an annular mounting plate arranged on the inflator support, and a mounting cylinder made of an elastic material and oriented parallel to the steering wheel axis. Further, means for interconnecting the components into the module are provided. The mounting cylinder has free rims connected, on the one hand, to the mounting plate and, on the other, to the inflator.

It is in this way that the inflator, representing the largest single mass of the air bag module, is connected solely via the mounting cylinder of elastic material to the remaining components of the air bag module and may thus be employed as a vibration damper. By suitable design and selection of material the mounting cylinder may be easily adapted to the various requirements so that the nuisance vibrations which differ from one type of vehicle to another are effectively suppressed. Doing away with other means of connecting the inflator to the mounting plate does not place restrictions on the design of the mounting cylinder which may thus be fully adapted to the requirements of the vibration system, apart from the strength needed for a reliable connection. By means of an auxiliary flange it can be assured that the inflator cannot be totally separated from the air bag module even if in the explosive-like inflation of the gas bag the reaction forces in accordance with the design were to be exceeded to such an extent that the mounting cylinder is destroyed. On the other hand, the mounting cylinder in accordance with the invention represents a component of relative simple design which takes up little space for installation and, in addition, may seal off the interior of the air bag from the environment so that no contamination is able to find its way into the air bag and no filling gases can escape in the case of activation.

The elastic mounting cylinder may further be fixed to a surrounding mounting flange connected to the housing of the inflator.

DETAILED DESCRIPTION OF PREFERRED EMBODIMENTS

Figure 1:
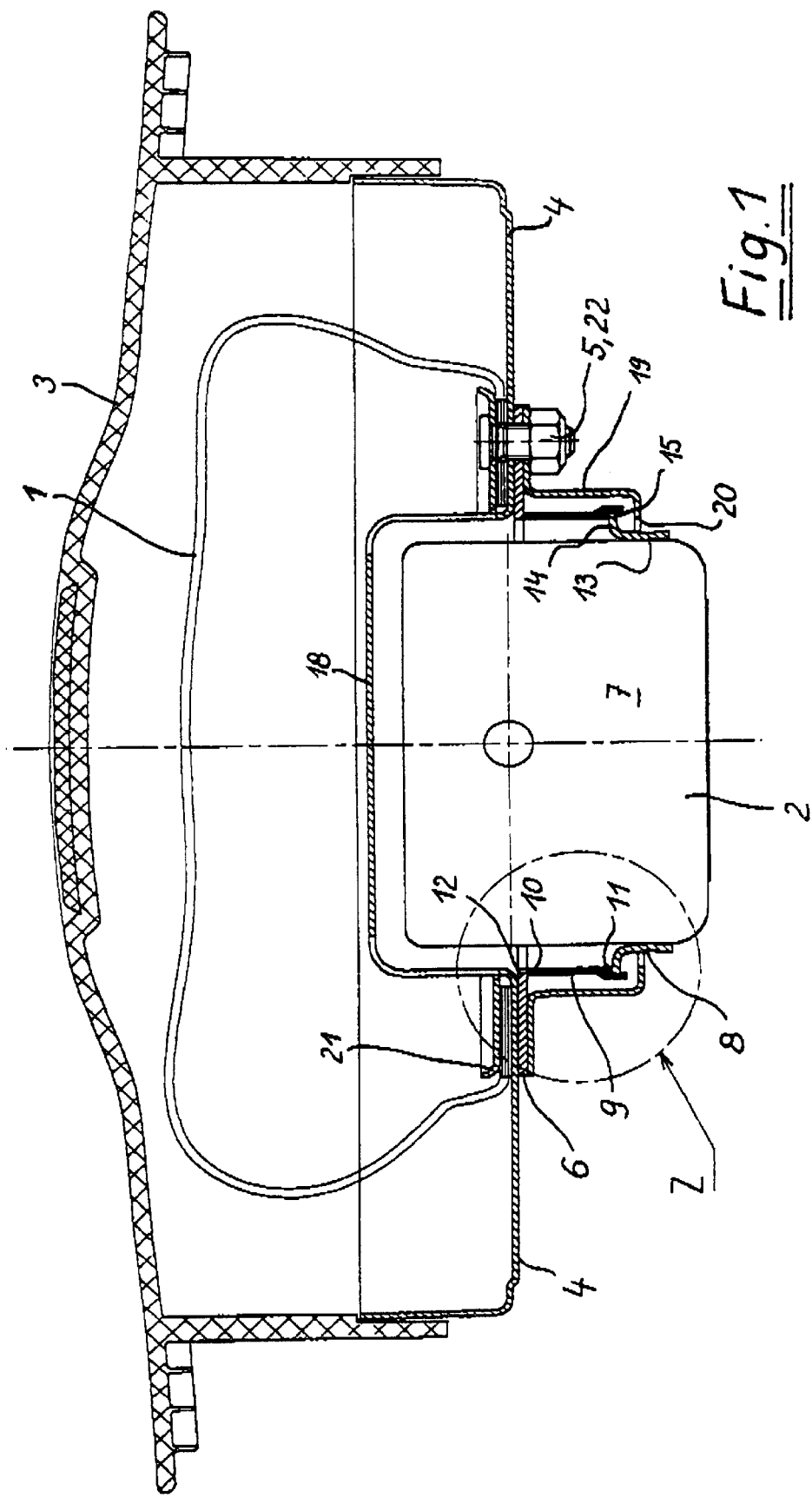
FIG. 1 is a section through an air bag module.

Referring now to FIG. 1 there is illustrated in section an embodiment comprising by known ways and means a gas bag 1, an inflator 2, a cover cap 3, an inflator support 4 as well as means 5 for interconnecting the cited parts into a module. The inflator 2 includes a surrounding mounting flange 8 configured L-shaped in cross-section and comprising a leg 13 extending concentrically to the housing 7 of the inflator 2 and another leg 14 protruding from the one leg outwards roughly at right angles thereto.

The air bag module in accordance with the invention further comprises an annular mounting plate 6 located in the fastening portion parallel to the underside of the inflator support 4. A 3 mounting cylinder 9 of an elastic material, provided in accordance with the invention, is connected by its free rims 10 and 11, on the one hand, to the mounting plate 6 and, on the other, to the mounting flange 8 of the inflator 2. Thus, the inflator 2 is mounted so as to be able to vibrate relative to the other components of the air bag module, and may be employed for damping unwanted vibrations.

The rim of the gas bag 1 surrounding the inlet opening is clamped in place by known ways and means between a gas bag holding plate 21 and the inflator support 4. In the embodiment as shown, the means 5 for connecting the module parts consist of bolts 22 and nuts. Together with the gas bag holding plate 21 and the inflator support 4, the mounting plate 6, as well as an auxiliary flange 19 hat shaped in cross-section, are bolted together by means of bolts 22. The mounting cylinder 9, in accordance with the invention, is connected by its upper free rim to the inner rim of the mounting plate 6 so as to stand perpendicular thereto. The lower rim 11 of the mounting cylinder 9 is connected to the outer rim 15 of the leg 14 protruding outwards. The rims 10, 11 of the mounting cylinder 9 are joined to the inflator 2 and the mounting plate 6 by one of vulcanizing, bonding and clamping.

Figure 2:
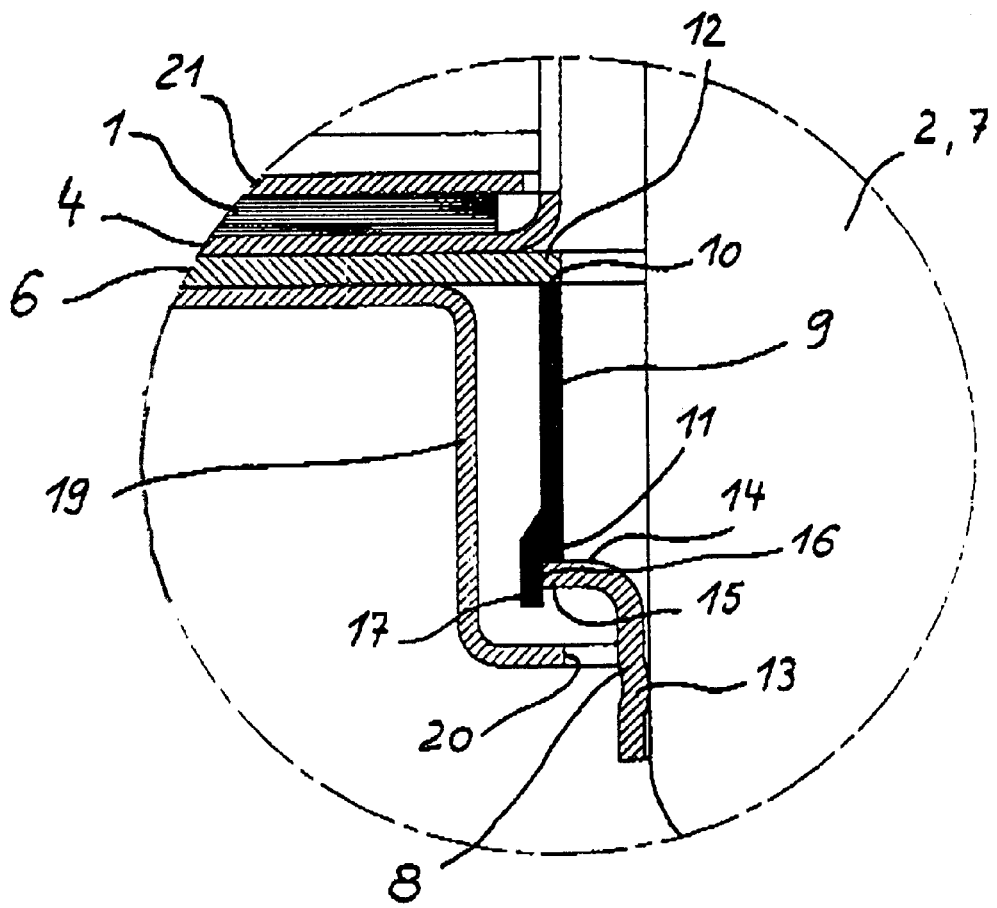
FIG. 2 is a magnified detail of "Z" taken from FIG. 1.

Referring now to FIG. 2, there is illustrated a detail on a magnified scale of how the mounting cylinder 9 is joined to the module parts. In the clamping region, the gas bag holding plate 21, the rim of the air bag 1, the inflator support 4, the mounting plate 6 and the auxiliary flange 19 lie one on top of the other. The inner rim 12 of the annular mounting plate 6 is connected to the upper rim 10 of the mounting cylinder 9. The mounting flange 8 applied to the housing 7 of the inflator 2 is configured L-shaped in cross-section and is provided with a leg 13 extending concentrically to the wall of the housing 7 and another leg 14 protruding outwards roughly at right angles thereto, the outer rim 15 thereof being connected to the lower rim 11 of the mounting cylinder.

Configured at the lower rim 11 of the mounting cylinder 9 is a stop 16 for the outer rim 15 of the mounting flange 8, this arrangement facilitating mutual assignment of the components. The stop is formed by a wall portion 17 protruding downwards. In conjunction with the lower rim 11 of the mounting cylinder 9, the mutual contact position of mounting flange and mounting cylinder is thus explicitly defined both in axial and radial direction. The auxiliary flange 19 being more or less hat-shaped in cross-section is provided with a central recess 20 the diameter of which is smaller than the outer diameter of the mounting flange. Should the mounting cylinder 9 rupture or be overstretched due to an overloading, the radially outwards protruding leg 14 of the mounting flange 8 comes to rest at the auxiliary flange 19 on the inside to thus support the inflator 2 to maintain it held in the air bag module even if the mounting cylinder 9 is destroyed. In addition, the lower rim 11 of the mounting cylinder 9 may be put to, use for sealing off the interior from the environment when it contacts the auxiliary flange 19 either intentionally or non-intentionally.

Figure 3:
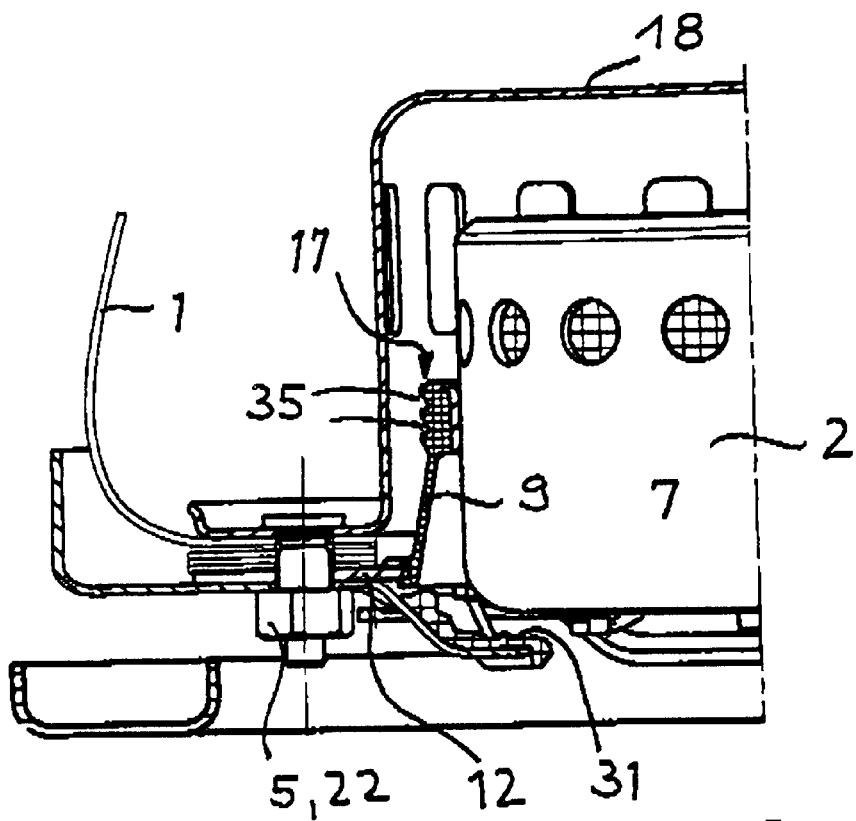
FIG. 3 is a section through one half of an air bag module according to a further embodiment.

According to the embodiment of FIG. 3, the inflator 2 is not hanging but standing within the mounting cylinder. Thus, upon activation of the inflator, a pressure force and not a pulling force (according to the embodiment of FIG. 2) is exerted on the mounting cylinder 9. A pressure force leads to a reduced stress of the mounting cylinder 9 so that the risk of a mounting cylinder damage during inflation is reduced. Upon activation of the inflator 2, the inflator moves axially until it contacts a stop ring 31.

In the region of the mounting cylinder 9, in which region the mounting cylinder 9 is attached to the inflator, a radial stop for the vibrating inflator 2 during the drive mode of the corresponding vehicle is provided. The radial stop is defined by the inner surface of the diffuser 18 which can be contacted by the radially protruding wall portion 17.

Figure 4:
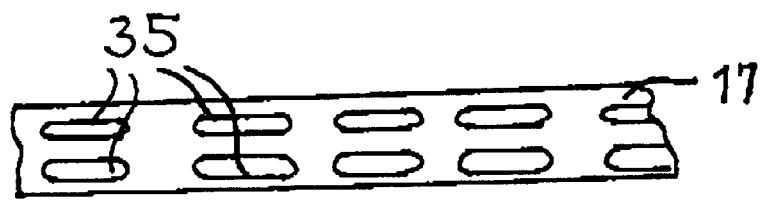
FIG. 4 is a developed view of the outer circumferential surface of the protruding wall portion of the mounting cylinder.

The contact of the protruding, circumferencially extending wall portion 17 and the diffuser 18 during the drive mode of the vehicle may cause noise nuisance (noises like a smacker or a loud kiss). The noise can be avoided by providing several, circumferencially displaced recesses 35 at the outer circumferencial surface of the wall portion 17. The elongated recesses extend over a portion of the circumferencial surface of the wall portion 17 as can be seen from FIG. 4.

What is claimed is:

1. An air bag module for a motor vehicle steering wheel having a steering wheel axis, said module comprising:
    a gas bag,
    an inflator having a housing,
    a cover cap,
    an inflator support,
    an annular mounting plate arranged on said inflator support,
    a mounting cylinder made of an elastic material and oriented parallel to said steering wheel axis, and
    means for interconnecting the components into said module,
    said mounting cylinder having free rims, one of said rims being connected to said mounting plate and another one of said rims being connected to said inflator,
    said mounting cylinder having a region attached to said inflator, said region having a radially projecting wall portion which is able to contact a radial stop.

2. The air bag module according to claim 1, wherein said projecting wall portion has recesses at an outer circumferential surface.

3. The air bag module according to claim 2, wherein said recesses extend over a portion of an outer circumference of said projecting wall portion.

4. The air bag module as set forth in claim 1, wherein said inflator includes a mounting flange surrounding said inflator, said flange being connected to said housing of said inflator.

5. The air bag module as set forth in claim 1, wherein said rims are joined to said inflator and said mounting plate by one of vulcanizing, bonding and clamping.

6. The air bag module as set forth in claim 1, wherein said mounting plate is arranged perpendicular to said steering wheel axis.

7. The air bag module as set forth in claim 6, wherein an inner rim of said mounting plate surrounds said housing of said inflator concentrically and spaced away therefrom.

8. The air bag module as set forth in claim 7, wherein an upper rim of said mounting cylinder is connected to said inner rim of said mounting plate so as to stand perpendicular thereto.

9. The air bag module as set forth in claim 1, wherein said inflator has a mounting flange which is L-shaped in cross-section and is connected by a leg of said mounting flange extending parallel to said steering wheel axis to said housing of said inflator and by a rim of said leg of said mounting flange protruding radially outwards to said mounting cylinder.

10. The air bag module as set forth in claim 4, wherein said mounting cylinder includes at a lower rim an annular stop for a rim of a mounting flange of s aid inflator.

11. The air bag module as set forth in claim 10 wherein said mounting cylinder includes at said lower rim a wall portion protruding downwards and wherein said stop is configured in said wall portion.

12. The air bag module as set forth in claim 11, wherein said wall portion is configured protruding outwards by roughly the wall thickness of said mounting cylinder and wherein said outer diameter of said mounting flange is roughly just as large as the outer diameter of said mounting cylinder in a portion not protruding outwards.

13. The air bag module as set forth in claim 12, wherein said wall portion is configured protruding downwards and may be employed for sealing an interior defined by said mounting cylinder.

14. The air bag module as set forth in claim 1, wherein an upper part of said housing of said inflator is surrounded by a diffuser hat-shaped in cross-section and maintained spaced away from said housing on all sides thereof.

15. The air bag module as set forth in claim 14, wherein a lower part of said housing of said inflator is surrounded by an auxiliary flange hat-shaped in cross-section and maintained spaced away from said housing on all sides thereof and having a central recess, a diameter of said recess being smaller than an outer diameter of said mounting flange.

16. The air bag module as set forth in claim 1, wherein said diffuser and said inflator support consists integrally of as shaped section of sheet metal.

17. An air bag module for a motor vehicle steering wheel having a steering wheel axis, said module comprising:
    a gas bag,
    an inflator having a housing,
    a cover cap, an inflator support, an annular mounting plate arranged on said inflator support, a mounting cylinder made of an elastic material and oriented parallel to said steering wheel axis, said mounting cylinder having a wall thickness and an axial length which is substantially greater than said wall thickness, and means for interconnecting the components into said module, said mounting cylinder having free opposite rims, one of said rims being attached to said mounting plate and another one of said rims being connected to said inflator which is arranged within said mounting cylinder to reduce inflator vibration noise.

* * * * *